United States Patent Office 2,964,698
Patented Dec. 13, 1960

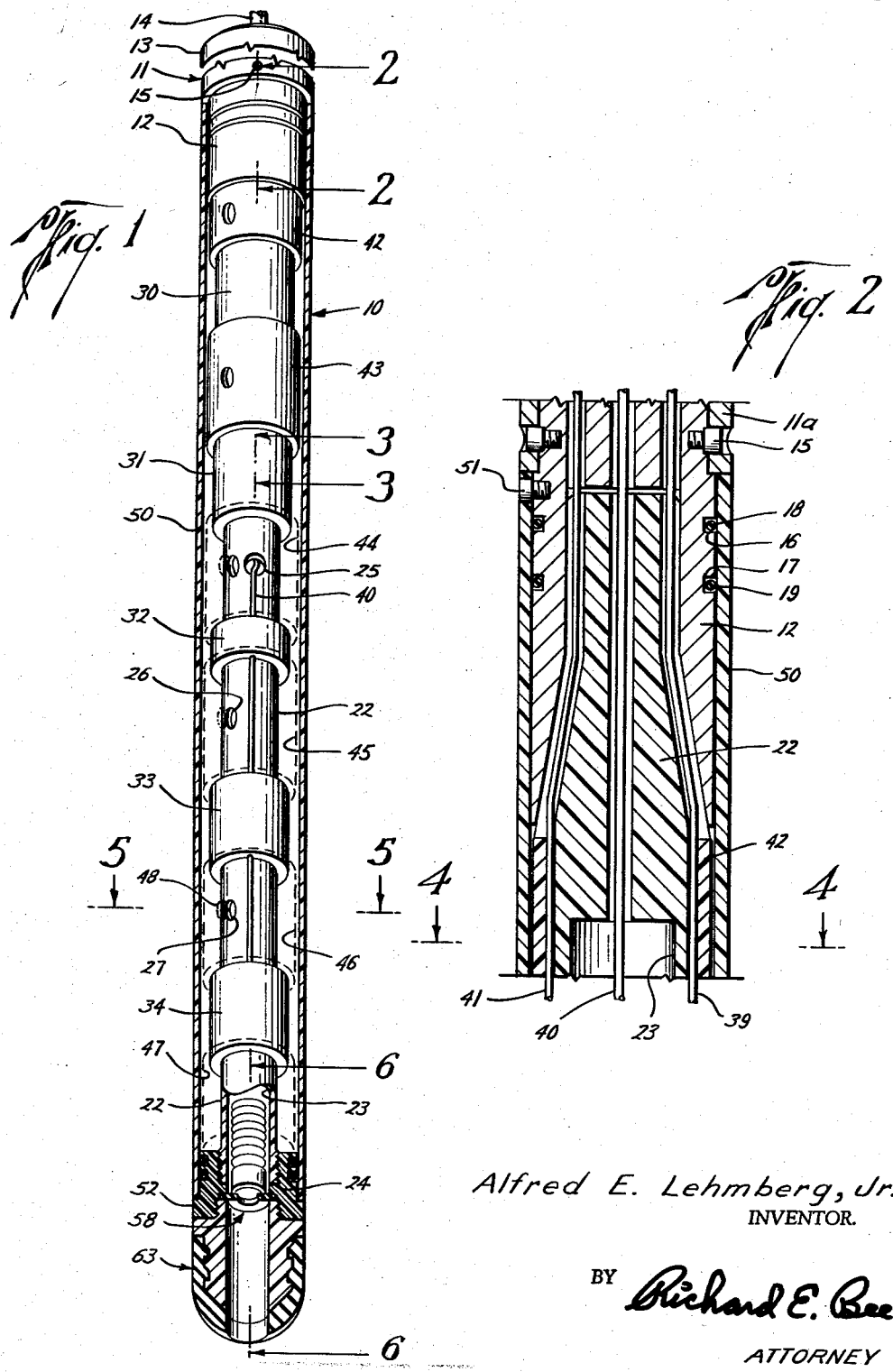

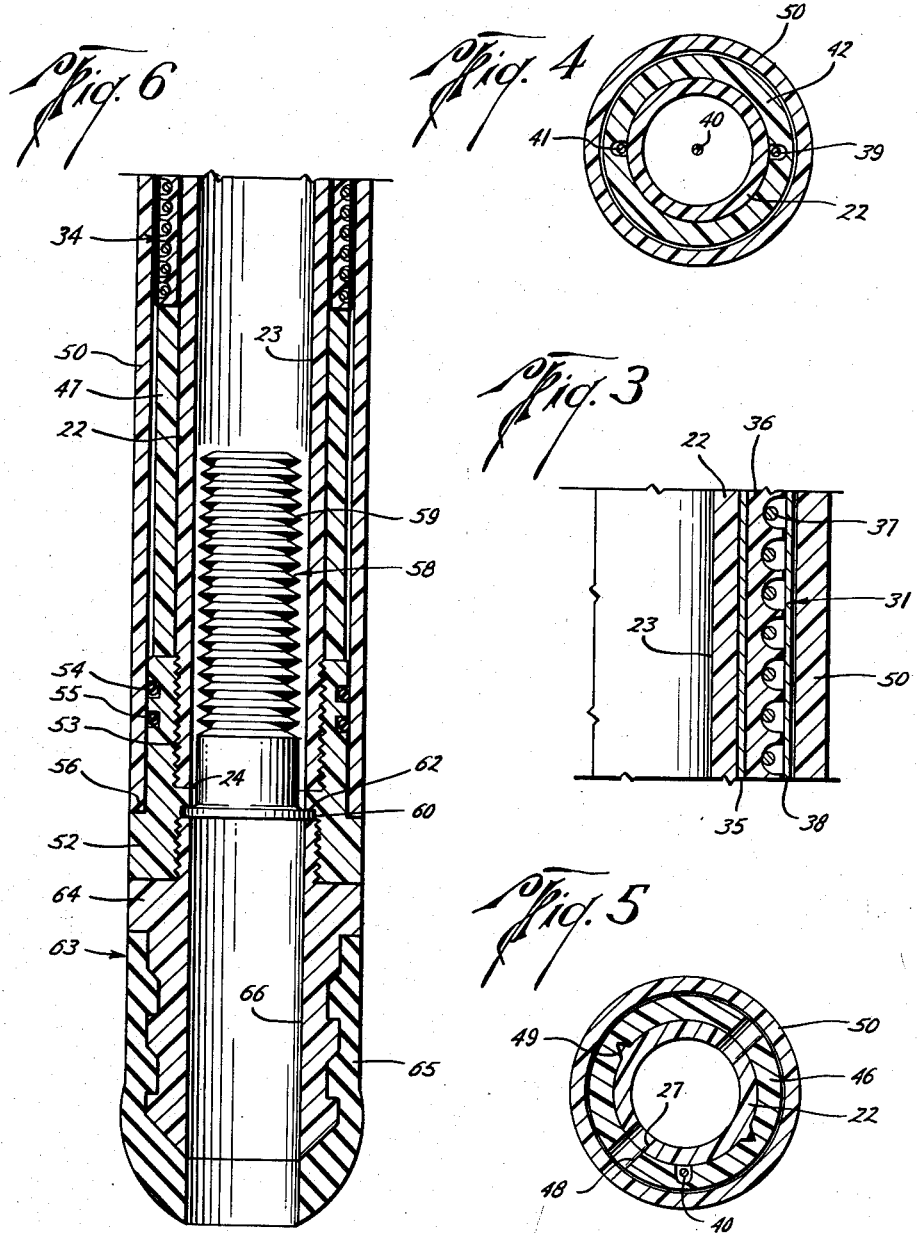

2,964,698

BOREHOLE INVESTIGATION APPARATUS

Alfred E. Lehmberg, Jr., Ridgefield, Conn., assignor to Schlumberger Well Surveying Corporation, Houston, Tex., a corporation of Texas Filed June 30, 1958, Ser. No. 745,563

10 Claims. (Cl. 324—10)

This invention relates to apparatus for investigating subsurface earth formations traversed by a borehole and, more particularly, to certain improvements in the portion of such apparatus which is adapted to be passed through the borehole. Although the present invention may have a wide variety of borehole applications, it is of particular utility in systems for electromagnetically investigating the earth formations and, consequently, will be described in this connection.

In apparatus for electromagnetically investigating the characteristics of the subsurface earth strata penetrated by a well or borehole, a borehole instrument commonly referred to as an "induction logging sonde" and which is comprised of a system of coils is adapted to be raised and lowered in the borehole. As the instrument or sonde is moved through the borehole, some of the coils are energized to induce current flow in the adjacent earth formations while other of the coils are utilized to provide signals representative of the electrical conductivity of the formations. Such signals are then generally transmitted to the surface of the earth where they actuate a suitable indicating device or are recorded by suitable recording apparatus or both.

Since the borehole is usually filled with drilling mud extending downwardly into the earth for several thousand feet, extremely large pressures are created in the lower regions of the borehole, such pressures sometimes becoming as great as 20,000 p.s.i. Also, the earth temperatures increase with depth, sometimes becoming as high as 350° F. These factors subject the borehole instrument to considerable physical stress and strain when it is in the lower regions of the borehole and in some cases the leakage of drilling mud into the interior of the instrument housing may occur. This tends to undesirably alter the operating characteristics of the coil system.

Borehole instruments for electromagnetic apparatus of the foregoing type have been heretofore constructed in a sufficiently rugged manner to withstand these severe operating conditions while the coils and other electrical parts have been sufficiently insulated to protect them from contact with the drilling mud. Such apparatus has operated extremely well under all circumstances and, in fact, has met a great measure of commercial success. However, the ruggedized construction does not always lend itself to easy repair and it may not provide a desired flexibility in the location of coils or other component parts.

It is an object of the invention therefore to provide new and improved borehole apparatus having an improved form of mechanical construction for withstanding the severe operating conditions frequently encountered in a borehole.

It is another object of the invention to provide a new and improved induction logging sonde which is more readily and easily repairable.

It is a further object of the invention to provide a new and improved induction logging sonde which affords a greater degree of freedom in construction and location of the electrical elements contained in the sonde.

In accordance with the invention, borehole investigating apparatus comprises an elongated support member having an interior passageway communicating between an outlet on one end of such member and at least one outlet on the exterior surface of such member intermediate the ends thereof. The apparatus also includes one or more sensing units secured to the support member. In addition, the apparatus includes an elongated, fluid-impermeable sleeve member enclosing the sensing unit and the support member. The apparatus also includes means for securing each end of the sleeve member to the support member and forming a fluid-tight seal therebetween. The apparatus further includes flexible, fluid-impermeable means sealing the outlet on the end of the support member thereby completing a fluid-tight housing about the sensing unit, this flexible sealing means enabling pressure equilization between the interior and exterior of such fluid-tight housing and also compensating for any volume change due to expansion or compression of the medium within the housing.

For a better understanding of the present invention, together with other and further objects thereof, reference is had to the following description taken in connection with the accompanying drawings, the scope of the invention being pointed out in the appended claims.

Referring to the drawings:

Fig. 1 is a partly sectional isometric view of a representative embodiment of an induction logging sonde constructed in accordance with the present invention;

Fig. 2 is a sectional view taken along the section line 2—2 of Fig. 1;

Fig. 3 is a sectional view taken along the section line 3—3 of Fig. 1;

Fig. 4 is a sectional view taken along the section line 4—4 of Fig. 2;

Fig. 5 is a sectional view taken along the section line 5—5 of Fig. 1; and

Fig. 6 is a sectional view taken along the section line 6—6 of Fig. 1.

Referring to Fig. 1 of the drawings, there is illustrated a representative embodiment of borehole induction logging apparatus 10 constructed in accordance with the present invention. Such apparatus includes a fluid-impermeable supporting head 11 having an extended lower portion 12 having a cylindrical outer surface. The upper portion of the supporting head 11 is mechanically connected to a fluid-tight cartridge or housing 13 with suitable electrical interconnections therebetween. For simplicity of illustration, the upper portion of supporting head 11 and the lower portion of housing 13 have been omitted from the drawings as indicated by the broken lines. Housing 13 contains the requisite electrical circuits for operating the coil system of apparatus 10 and is, in turn, connected to an armored multiconductor electrical cable 14. When the apparatus is in operation in a borehole, cable 14 is suspended from the surface of the earth and serves both to raise and lower the apparatus in the borehole and to afford electrical communication between the downhole apparatus and the surface equipment. The electrical operation of the apparatus and typical electrical circuits which may be utilized are described in more detail in U.S. Patents 2,582,314 and 2,788,483, both granted to H. G. Doll, the former on January 15, 1952 and the latter on April 9, 1957.

The construction of the supporting head 11 may be better seen by referring to the sectional view of Fig. 2. Such supporting head 11 includes a cylindrical metal sleeve 11a enclosing the upper part of the extended portion 12, which is also metal, the sleeve 11a being secured thereto by means of retaining screws 15. The extended portion 12, the lower portion of which is hollow inside, includes a plurality of O ring elements indicated by O ring grooves 16 and 17 containing O rings 18 and 19 therein.

The apparatus 10 further includes an elongated central support member 22 of nonmagnetic material which extends along nearly the entire length of the device. This support member 22 is of cylindrical hollow configuration and has an interior passageway 23 communicating between an outlet 24 at the bottom end of such member and at least one outlet on the exterior surface of such support member intermediate the ends thereof. In particular, the interior passageway 23 communicates between the end outlet 24 and a plurality of outlets some of which are indicated by outlets 25, 26 and 27 spaced longitudinally along member 22. As best seen in Fig. 2, the upper end of the support member 22 is tapered and is wedged into the supporting head 11 centrally of the extended lower portion 12 by forcing such tapered portion into the extended portion 12, where it may be further secured by suitable retaining screws (not shown). The support member 22 is constructed of a rugged, nonmagnetic material such as plastic-impregnated Fiberglas and may be of one-piece construction as illustrated or, instead, may be made in sections which are suitably secured to one another.

The apparatus 10 also includes one or more sensing units represented in the present embodiment by a plurality of spaced apart coil units 30–34, inclusive, individually encircling and secured to the support member 22 in longitudinally spaced relation. For a so-called "focused" type of coil system as described in the above-mentioned Doll Patent 2,582,314, the electrical characteristics of these coils, their relative number of turns, their positions relative to one another, etc., are selected in accordance with the principles set forth in such patent. Other types of coil systems may also be utilized. The detailed physical construction of one form of coil that may be used with the present invention is seen in Fig. 3, which represents a sectional view of a portion of the coil unit 31. As there shown, the coil unit 31 includes an inner electrostatic shield member 35, which is cemented to the support member 22, and a grooved coil form 36 of a nonmagnetic material, such as plastic-impregnated Fiberglas, which, in turn, is cemented to the electrostatic shield 35. The coil winding proper consists of a series of turns of a conductor wire 37 laid in suitable grooves in the coil form 36. An outer, electrostatic shield 38 is cemented to the exterior of the coil form 36 to complete the coil assembly 31. Both of the electrostatic shields 35 and 38 consist of a series of narrow, parallel, longitudinally extending strips of conductive material fixed to a suitable insulating base material which may be constructed in accordance with any of the well-known printed circuit techniques. Each of the other coil units 30 and 32–34 is constructed in a similar manner.

Electrical connections to the various coils and their associated electrostatic shields are made by way of insulated conductors contained within shielded cables running down the center of and along the exterior surface of the support member 22. Portions of such conductor cables are indicated in Figs. 2 and 4 by the elements 39, 40 and 41. These conductor cables pass up through the interior of the supporting head 11 to the circuits within the housing 13 which, in turn, are connected to the conductors in the cable 14. The cable 39 serves to interconnect the coils 30 and 31 in series and such coils may then be utilized as receiver coils. Similarly, the cable 40 which passes down the interior of the support member 22 and thence up through the outlet 25 and along the exterior surface of the member 22, as shown in Fig. 1, serves to connect the remaining coils 32–34 in series and such coils serve as transmitter coils. The conductors of cable 41 serve to interconnect the various electrostatic shields to one another and to a suitable electrical grounding point.

The apparatus 10 further includes a plurality of hollow, cylindrical spacer members 42–47, inclusive, occupying most of the regions intermediate the coil units 30–34 exterior to the support member 22, such spacer members 42–47 being constructed to allow fluid passage between the interior and exterior of the region occupied thereby. The upper two spacers 42 and 43 are shown in full line in Fig. 1, while the lower four spacers 44–47 are indicated in dash line form in order to enable the underlying construction to be seen. As shown in Fig. 1, these spacers are of slightly larger diameter than the coils 30–34. In order to allow fluid passage between the interior and exterior of the spacer members, such members may contain one or more ports therein as illustrated by port 48 of the spacer member 46, the details of which are shown in the sectional view of Fig. 5. As there seen, the port 48 may be maintained in alignment with the outlet 27 in the support member 22 by means of a key and slot arrangement 49. Alternatively, the spacer members may be dimensioned to provide sufficient clearance within the interior and around the edges thereof for enabling the desired fluid passage.

The apparatus 10 also includes an elongated, fluid-impermeable sleeve member 50 of nonmagnetic material such as plastic-impregnated fiberglas enclosing the coils 30–34, spacer members 42–47 and support member 22 and overlapping at the upper end the extended lower portion 12 of the supporting head 11. The inside diameter of the overlapping upper end of the sleeve 50 relative to the outside diameter of the overlapped supporting head portion 12 is such as to form an essentially fluid-tight fit between these members. The O rings 18 and 19 (Fig. 2) further serve to insure that no fluid seepage will occur between the sleeve member 50 and the extended portion 12 of the supporting head 11. A retaining screw 51 serves to secure the sleeve member 50 against rotational movement.

At the lower end of the sleeve member 50, a closure member 52 of nonmagnetic material, such as Bakelite, serves to secure the sleeve member 50 to the periphery of the support member 22 so as to form a fluid-tight seal therebetween. To this end, as seen in the enlarged sectional view of Fig. 6, suitable threads 53 on the closure member 52 engage mating threads on the lower end of the support member 22, a pair of O rings 54 and 55 serving to establish a fluid-tight seal between the interior of the sleeve member 50 and the closure member 52. Shoulder 56 of the closure member 52 serves to support and hold in longitudinal position the sleeve member 50, the outer diameter of shoulder 56 being the same as the outer diameter of sleeve 50.

As seen in Figs. 1 and 6, the apparatus 10 further includes flexible, fluid-impermeable means sealing the outlet 24 on the end of the support member 22 thereby completing a fluid-tight housing about the coils 30–34. For the present embodiment, this sealing means is in the form of a bellows member 58 having a bellows portion 59 and a shoulder portion 60, the shoulder portion being secured to the periphery of the outlet 24 and the bellows portion 59 extending inwardly into the interior passageway 23 for enabling pressure equalization between the interior and exterior of the fluid-tight housing formed about the coils. To this end, the shoulder portion 60 of the bellows member 58 is held against a shoulder 62 of the closure member 52 by means of a nonmagnetic nose piece 63 which is adapted for threaded engagement with the closure member 52. The nose piece 63 includes an inner portion 64 of nonmagnetic material such as Bakelite and an outer portion 65 of rubber molded thereto. The interior of the nose piece 63 is hollow and has a lower opening so as to form a fluid passageway 66 communicating between the exterior of the apparatus 10 and the bellows member 58.

As seen from the foregoing, the supporting head 11, the sleeve member 50, the closure member 52 and the bellows member 58 form a fluid-tight housing completely enclosing the coil units 30—34, inclusive. As a consequence, none of the drilling mud or other fluid contained in the borehole can penetrate into the interior of this housing and attack the coils, their associated electrostatic shields or the various electrical connections, or otherwise alter their electrical characteristics. In order to prevent excessive pressure differentials from building up between the interior and exterior of this fluid-tight housing as the housing is lowered into the borehole, the bellows member 58 provides a flexible coupling between these regions and thus enables the interior housing pressure to be equalized or made the same as the exterior borehole pressure. In other words, as the borehole pressure changes, the bellows member 58 either expands or contracts to correspondingly change the internal pressure within the fluid-tight housing. In addition to reducing the strength required of the sonde structural members, this also reduces the likelihood of seepage of the drilling mud into the sonde interior.

In order to reduce the amount of expansion and contraction required of the bellows member 58, the fluid-tight housing about the coils is filled with a compressible, noncorrosive, nonconductive fluid having a compressibility which largely offsets any thermal expansion of such fluid as the apparatus 10 is lowered into the borehole. A particularly suitable fluid for this purpose is silicone oil which, for average borehole conditions, has a compressibility which cancels the thermal expansion. Consequently, very little movement may be required of the bellows member 58 under average borehole conditions. Except for the space occupied by the solid portions of the spacer members 42—47, the coil units 30—34, etc., the interior of the sleeve member 50 is completely filled with such compressible fluid. The various intermediate outlets in the support member 22 and the ports in the spacers 42—47 as well as the loose fit of such spacers readily enables the compressible fluid to communicate with all regions within the interior of the sleeve 50.

The apparatus or sonde 10 is initially filled with the compressible fluid by elevating the bottom end of the sonde and removing the nose piece 63 and the bellows member 58. When filling the sonde, sufficient time and care should be allowed to permit all the air contained in the device to escape. In case the borehole instrument or sonde later becomes defective and requires repairs, all that is required is to remove the nose piece 63, drain the fluid and then remove the closure member 52, after which the sleeve 50 may be removed. The coils or other electrical connections may then be readily repaired. The relatively open construction of the coils readily facilitates any repair or modification thereof. This open type of construction also affords a greater freedom in the design of the coils and especially the electrostatic shields associated therewith. Also, the relatively large interior passageway 23 and the intermediate outlets along the support member 22 enable greater freedom in the placement of the electrical conductor cables interconnecting the various coils.

From the foregoing description of the illustrated embodiment of an induction logging sonde constructed in accordance with the present invention, it is seen that such a sonde has an improved form of mechanical construction for withstanding the severe operating conditions frequently encountered in a borehole.

Although the invention has been described in connection with induction-type well logging apparatus, it is applicable to other systems. For example, instead of coils for exploring electromagnetically the earth formations, transducers for acoustical well logging may be supported on mandrel 22 and associated with appropriate electrical circuitry. Accordingly, the term "sensing unit" as used herein is intended to denote either electromagnetic coils or acoustical transducers, as well as other types of elements. Also, in some cases such as acoustical logging, it may be preferable to fill the fluid-tight housing with a substantially incompressible fluid as opposed to a compressible fluid which is preferred for induction logging.

While there has been described what is at present considered to be a preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Borehole investigating apparatus comprising: an elongated support member having an interior passageway communicating between an outlet on one end of such member and at least one outlet on the exterior surface of such member intermediate the ends thereof; a sensing unit secured to said support member; an elongated, fluid-impermeable sleeve member enclosing said sensing unit and support member; means for securing each end of said sleeve member to said support member and forming a fluid-tight seal therebetween; and flexible, fluid-impermeable means sealing the outlet on the end of said support member thereby completing a fluid-tight housing about said sensing unit, said flexible sealing means enabling pressure equalization between the interior and exterior of the fluid-tight housing.

2. Borehole investigating apparatus comprising: an elongated support member having an interior passageway communicating between an outlet on one end of such member and at least one outlet on the exterior surface of such member intermediate the ends thereof; a plurality of coils secured to said support member; an elongated, fluid-impermeable sleeve member encircling said coils and support member; means for securing each end of said sleeve member to said support member and forming a fluid-tight seal therebetween; and flexible, fluid-impermeable means sealing the outlet on the end of said support member thereby completing a fluid-tight housing about said coils, said flexible sealing means enabling pressure equalization between the interior and exterior of the fluid-tight housing.

3. Borehole investigating apparatus comprising: a cylindrical support member of nonmagnetic material; a plurality of spaced apart coils individually encircling and secured to said support member; said support member having an interior passageway communicating between an outlet on one end of such member and a plurality of outlets on the exterior surface of such member intermediate said coils; a cylindrical, fluid-impermeable sleeve member of nonmagnetic material encircling said coils and support member; means for securing each end of said sleeve member to said support member and forming a fluid-tight seal therebetween; and flexible, fluid-impermeable means sealing the outlet on the end of said support member thereby completing a fluid-tight housing about said coils, said flexible sealing means enabling pressure equalization between the interior and exterior of the fluid-tight housing.

4. Borehole investigating apparatus comprising: an elongated support member having an interior passageway communicating between an outlet on one end of such member and at least one outlet on the exterior surface of such member intermediate the ends thereof; a sensing unit secured to said support member; an elongated, fluid-impermeable sleeve member encircling said sensing unit and support member; means for securing each end of said sleeve member to said support member and forming a fluid-tight seal therebetween; and flexible, fluid-impermeable means sealing the outlet on the end of said support member thereby completing a fluid-tight housing about said sensing unit, said flexible sealing means enabling pressure equalization between the interior and exterior of the fluid-tight housing; said fluid-tight housing being filled with a compressible fluid having a compressibility which largely offsets any thermal expansion of such fluid as the apparatus is lowered into the borehole.

5. Borehole investigating apparatus comprising: an elongated support member having an interior passageway communicating between an outlet on one end of such member and at least one outlet on the exterior surface of such member intermediate the ends thereof; a sensing unit secured to said support member; an elongated, fluid-impermeable sleeve member encircling said sensing unit and support member; means for securing each end of said sleeve member to said support member and forming a fluid-tight seal therebetween; and flexible, fluid-impermeable means sealing the outlet on the end of said support member thereby completing a fluid-tight housing about said sensing unit, said flexible sealing means enabling pressure equalization between the interior and exterior of the fluid-tight housing; said fluid-tight housing being filled with silicone oil.

6. Borehole investigating apparatus comprising: an elongated support member having an interior passageway communicating between an outlet on one end of such member and at least one outlet on the exterior surface of such member intermediate the ends thereof; a plurality of spaced apart coils secured to said support member; a plurality of spacer members occupying most of the region intermediate said coils and exterior to said support member, such spacer members being constructed to allow fluid passage between the interior and exterior of such region; an elongated, fluid-impermeable sleeve member encircling said coils, spacer members and support member; means for securing each end of said sleeve member to said support member and forming a fluid-tight seal therebetween; and flexible, fluid-impermeable means sealing the outlet on the end of said support member thereby completing a fluid-tight housing about said coils, said flexible sealing means enabling pressure equalization between the interior and exterior of the fluid-tight housing; said fluid-tight housing being filled with a compressible fluid having a compressibility which largely offsets any thermal expansion of such fluid as the apparatus is lowered into the borehole.

7. Borehole investigating apparatus comprising: a fluid-impermeable supporting head having an extended lower portion having a cylindrical outer surface; an elongated support member having an interior passageway communicating between an outlet on one end of such member and at least one outlet on the exterior surface of such member intermediate the ends thereof, the other end of such member being secured to said supporting head centrally of said extended lower portion thereof; a sensing unit secured to said support member; a cylindrical, fluid-impermeable sleeve member encircling said sensing unit and support member and overlapping at one end the extended lower portion of said supporting head, the inside diameter of the overlapping sleeve portion relative to the outside diameter of the overlapped supporting head portion being such as to form an essentially fluid-tight fit; a closure member secured between the other end of said sleeve member and the periphery of said support member and forming a fluid-tight seal therebetween; and flexible, fluid-impermeable means sealing the outlet on the end of said support member thereby completing a fluid-tight housing about said sensing unit, said flexible sealing means enabling pressure equalization between the interior and exterior of the fluid-tight housing.

8. Borehole investigating apparatus comprising: an elongated support member having an interior passageway communicating between an outlet on one end of such member and at least one outlet on the exterior surface of such member intermediate the ends thereof; a sensing unit secured to said support member; an elongated, fluid-impermeable sleeve member encircling said sensing unit and support member; means for securing each end of said sleeve member to said support member and forming a fluid-tight seal therebetween; and a flexible, fluid-impermeable bellows member sealing the outlet on the end of said support member thereby completing a fluid-tight housing about said sensing unit, said bellows member enabling pressure equalization between the interior and exterior of the fluid-tight housing.

9. Borehole investigating apparatus comprising: an elongated support member having an interior passageway communicating between an outlet on one end of such member and at least one outlet on the exterior surface of such member intermediate the ends thereof; a sensing unit secured to said support member; an elongated, fluid-impermeable sleeve member encircling said sensing unit and support member; means for securing each end of said sleeve member to said support member and forming a fluid-tight seal therebetween; and a flexible, fluid-impermeable bellows member having a bellows portion and a shoulder portion, said shoulder portion being secured to the periphery of the outlet on the end of said support member thereby completing a fluid-tight housing about said sensing unit, said bellows portion extending inwardly into said interior passageway for enabling pressure equalization between the interior and exterior of the fluid-tight housing.

10. Borehole investigating apparatus comprising: a fluid-impermeable supporting head having an extended lower portion having a cylindrical outer surface; a cylindrical support member of nonmagnetic material; a plurality of spaced apart coils individually encircling and secured to said support member; said support member having an interior passageway communicating between an outlet on one end of such member and a plurality of outlets on the exterior surface of such member intermediate the coils, the other end of such member being secured to said supporting head centrally of said extended lower portion thereof; a plurality of spacer members occupying most of the region intermediate said coils and exterior to said support member, such spacers being constructed to allow fluid passage between the interior and exterior of such region; a cylindrical, fluid-impermeable sleeve member of nonmagnetic material encircling said coils, spacer members and support member and overlapping at one end the extended lower portion of said supporting head, the inside diameter of the overlapping sleeve portion relative to the outside diameter of the overlapped supporting head portion being such as to form an essentially fluid-tight fit; a closure member secured between the other end of said sleeve member and the periphery of said support member and forming a fluid-tight seal therebetween; and a flexible, fluid-impermeable bellows member having a bellows portion and a shoulder portion, said shoulder portion being secured to the periphery of the outlet on the end of said support member thereby completing a fluid-tight housing about said coils, said bellows portion extending inwardly into said interior passageway for enabling pressure equalization between the interior and exterior of the fluid-tight housing; said fluid-tight housing being filled with a compressible fluid having a compressibility which largely offsets any thermal expansion of such fluid as the apparatus is lowered into the borehole.

References Cited in the file of this patent

UNITED STATES PATENTS

| | | |
|---|---|---|
| 2,581,979 | Standing | Jan. 8, 1952 |
| 2,669,689 | Doll | Feb. 16, 1954 |
| 2,826,736 | Doll | Mar. 11, 1958 |